(12) United States Patent
Nomura et al.

(10) Patent No.: US 7,657,164 B2
(45) Date of Patent: Feb. 2, 2010

(54) SUBJECT SHAKE DETECTION DEVICE, IMAGING DEVICE, CONTROL METHOD THEREOF, CONTROL PROGRAM, AND RECORDING MEDIUM

(75) Inventors: Kazuo Nomura, Shiojiri (JP);
Michihiro Nagaishi, Okaya (JP);
Megumi Sano, Tachikawa (JP)

(73) Assignee: Seiko Epson Corporation (JP)

( * ) Notice: Subject to any disclaimer, the term of this patent is extended or adjusted under 35 U.S.C. 154(b) by 308 days.

(21) Appl. No.: 11/695,100

(22) Filed: Apr. 2, 2007

(65) Prior Publication Data

US 2007/0230931 A1    Oct. 4, 2007

(30) Foreign Application Priority Data

Apr. 3, 2006    (JP) .............................. 2006-101352

(51) Int. Cl.
*G03B 17/00*    (2006.01)
*H04N 5/228*    (2006.01)

(52) U.S. Cl. ...................... 396/55; 396/153; 348/208.2; 348/208.4; 348/208.14

(58) Field of Classification Search .................. 396/55, 396/52, 153, 53; 348/208.99, 208.1, 208.2, 348/208.3, 208.4, 208.5, 208.14, 208.6; 359/554, 359/557
See application file for complete search history.

(56) References Cited

U.S. PATENT DOCUMENTS

2005/0128309 A1*   6/2005   Tomita et al. ............ 348/208.7

FOREIGN PATENT DOCUMENTS

| JP | 05-313241 | 11/1993 |
| JP | 06-051383 | 2/1994 |
| JP | 08-320511 | 12/1996 |
| JP | 11-326980 | 11/1999 |

* cited by examiner

*Primary Examiner*—Rochelle-Ann J Blackman
(74) *Attorney, Agent, or Firm*—Harness, Dickey & Pierce, P.L.C.

(57) ABSTRACT

A subject shake detection device includes a shake detection unit that detects a shake amount of an imaging unit for photographing a subject, a subject shake detection unit that detects an image shake amount from a motion picture to be photographed by the imaging unit and acquires a subject shake amount on the basis of a difference between the image shake amount and the shake amount, and an informing unit that informs a subject shake on the basis of the subject shake amount.

6 Claims, 4 Drawing Sheets

SUBJECT SHAKE DETECTION DEVICE, IMAGING DEVICE, CONTROL METHOD THEREOF, CONTROL PROGRAM, AND RECORDING MEDIUM

BACKGROUND

1. Technical Field

The present invention relates to a subject shake detection device that can detect a subject shake, an imaging device, a control method thereof a control program, and a recording medium.

2. Related Art

There is known a camera shake warning device that detects a camera shake upon photographing and informs a photographer of the occurrence of the camera shake (for example, see JP-A-5-313241). In an imaging device having such a camera shake detection function, photographing is performed when a camera shake amount detected after a shutter button is pushed is below a threshold value (for example, see JP-A-8-320511).

However, in the related art, a shake amount of an imaging device is detected as the camera shake. When the subject shake occurs even if photographing is performed at a timing at which the camera shake amount is below the threshold value, the shaken image is photographed. Further, in the related art, it is difficult to separately detect the camera shake and the subject shake. Further, it is difficult to accurately detect the subject shake.

SUMMARY

An advantage of some aspects of the invention is that it provides a subject shake detection device that can accurately detect a subject shake, an imaging device, a control method thereof, a control program, and a recording medium, According to a first aspect of the invention, a subject shake detection device includes a shake detection unit that detects a shake amount of an imaging unit for photographing a subject, a subject shake detection unit that detects an image shake amount from a motion picture to be photographed by the imaging unit and acquires a subject shake amount on the basis of a difference between the image shake amount and the shake amount, and an information unit that informs a subject shake on the basis of the subject shake amount.

According to this structure, the shake amount of the imaging unit is detected, and the image shake amount from the motion picture to be photographed by the image unit is detected. Then, the subject shake amount is acquired on the basis of the difference between the image shake amount and the shake amount, and the subject shake is informed. Therefore, it is possible to accurately detect the subject shake and inform a user of the subject shake.

In the subject shake detection device according to the first aspect of the invention, the subject shake detection unit may acquire a motion vector of the motion picture to be photographed and detect the image shake amount on the basis of the motion vector. According to this structure, since the image shake amount is detected on the basis of the motion vector of the motion picture to be photographed, it is possible to accurately detect the image shake amount. Therefore, it is possible to accurately detect the subject shake to be acquired using the image shake amount.

According to a second aspect of the invention, an imaging device includes an imaging unit that photographs a subject, a shake detection unit that detects a shake amount of the imaging unit, a subject shake detection unit that detects an image shake amount from a motion picture to be photographed by the imaging unit and acquires a subject shake amount on the basis of a difference between the image shake amount and the shake amount, and an imaging control unit that allows photographing under an imaging condition for preventing a subject shake.

According to this structure, the shake amount of the imaging unit is detected, and the image shake amount is detected from the motion picture to be photographed by the imaging unit. Then, the subject shake amount is acquired on the basis of the difference between the image shake amount and the shake amount, and photographing is performed under the imaging condition for preventing the subject shake. Accordingly, it is possible to accurately detect the subject shake and to perform photographing while appropriately preventing the subject shake.

In the imaging device according to the second aspect of the invention, the subject shake detection unit may acquire a motion vector of the motion picture to be photographed and detect the image shake amount on the basis of the motion vector. According to this structure, since the image shake amount is detected on the basis of the motion vector of the motion picture to be photographed, it is possible to accurately detect the image shake amount. Therefore, it is possible to accurately detect the subject shake to be acquired using the image shake amount.

In the imaging device according to the second aspect of the invention, the imaging control unit may calculate a prediction shake amount based on the subject shake amount and an automatically set imaging condition, set an imaging condition for preventing the subject shake on the basis of the prediction shake amount when the prediction shake amount exceeds an allowable value, and allow photographing to be performed under the set imaging condition. According to this structure, the prediction shake amount is calculated on the basis of the subject shake amount and the automatically set imaging condition and photographing is performed under the imaging condition for preventing the subject shake when the prediction shake amount exceeds the allowable value. Therefore, it is possible to perform photographing while appropriately preventing the subject shake.

In the imaging device according to the second aspect of the invention, when the prediction shake amount exceeds the allowable value, the informing unit may inform the subject shake. According to this structure, it is possible to inform the user of the subject shake. Further, in the imaging device according to the second aspect of the invention, the imaging control unit may calculate the prediction shake amount on the basis of the shake amount acquired by the shake detection unit and the automatically set imaging condition, set an imaging condition for preventing a camera shake on the basis of the shake amount when the prediction shake amount exceeds the allowable value and allow photographing to be performed under the set imaging condition for preventing the camera shake, and set an imaging condition for preventing the subject shake when the prediction shake amount is below the allowable value and allow photographing to be performed under the set imaging condition for preventing the subject shake. According to this structure, the prediction shake amount is calculated and photographing is performed under the imaging condition for preventing the camera shake or under the imaging condition for preventing the subject shake. Accordingly, it is possible to set an appropriate imaging condition according to the camera shake or the subject shake. Therefore, it is possible to appropriately perform photographing according to the kind of shake.

According to a third aspect of the invention, a method of controlling a subject shake detection device includes detecting a shake amount of an imaging unit for photographing a subject, detecting an image shake amount from a motion picture to be photographed by the imaging unit and acquiring a subject shake amount on the basis of a difference between the image shake amount and the shake amount, and informing the subject shake on the basis of the subject shake amount.

According to this structure, the shake amount of the imaging unit is detected, and the image shake amount is detected from the motion picture to be photographed by the imaging unit. Then, the subject shake amount is acquired on the basis of the difference between the image shake amount and the shake amount, and the subject shake is informed. Therefore, it is possible to accurately detect the subject shake and inform a user of the subject shake.

According to a fourth aspect of the invention, a method of controlling an imaging device includes detecting a shake amount of an imaging unit for photographing a subject, detecting an image shake amount from a motion picture to be photographed by the imaging unit and acquiring a subject shake amount on the basis of a difference between the image shake amount and the shake amount, and allowing photographing to be performed under an imaging condition for preventing a subject shake. According to this structure, the shake amount of the imaging unit is detected, and the image shake amount is detected from the motion picture to be photographed by the imaging unit. Then, the subject shake amount is acquired on the basis of the difference between the image shake amount and the shake amount, and photographing is performed under the imaging condition for preventing the subject shake. Therefore, it is possible to accurately detect the subject shake and to perform photographing while appropriately preventing the subject shake.

The aspects of the invention may be applied to a control program for executing the invention that may be downloaded through an electric communication line or may be distributed to be stored in a computer-readable recording medium, such as a magnetic recording medium, an optical recording medium, or a semiconductor recording medium, in addition to the subject shake detection device, the imaging device, and the control method thereof.

In the subject shake detection device, the imaging device, the control method thereof, the control program, and the recording medium according to the aspects of the invention, the shake amount of the imaging unit is detected, and the image shake amount is detected from the motion picture to be photographed by the imaging unit. Then, the subject shake amount is acquired on the basis of the difference between the image shake amount and the shake amount. Therefore, it is possible to accurately detect the subject shake.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described in detail with reference to the drawings.

Figure 1:
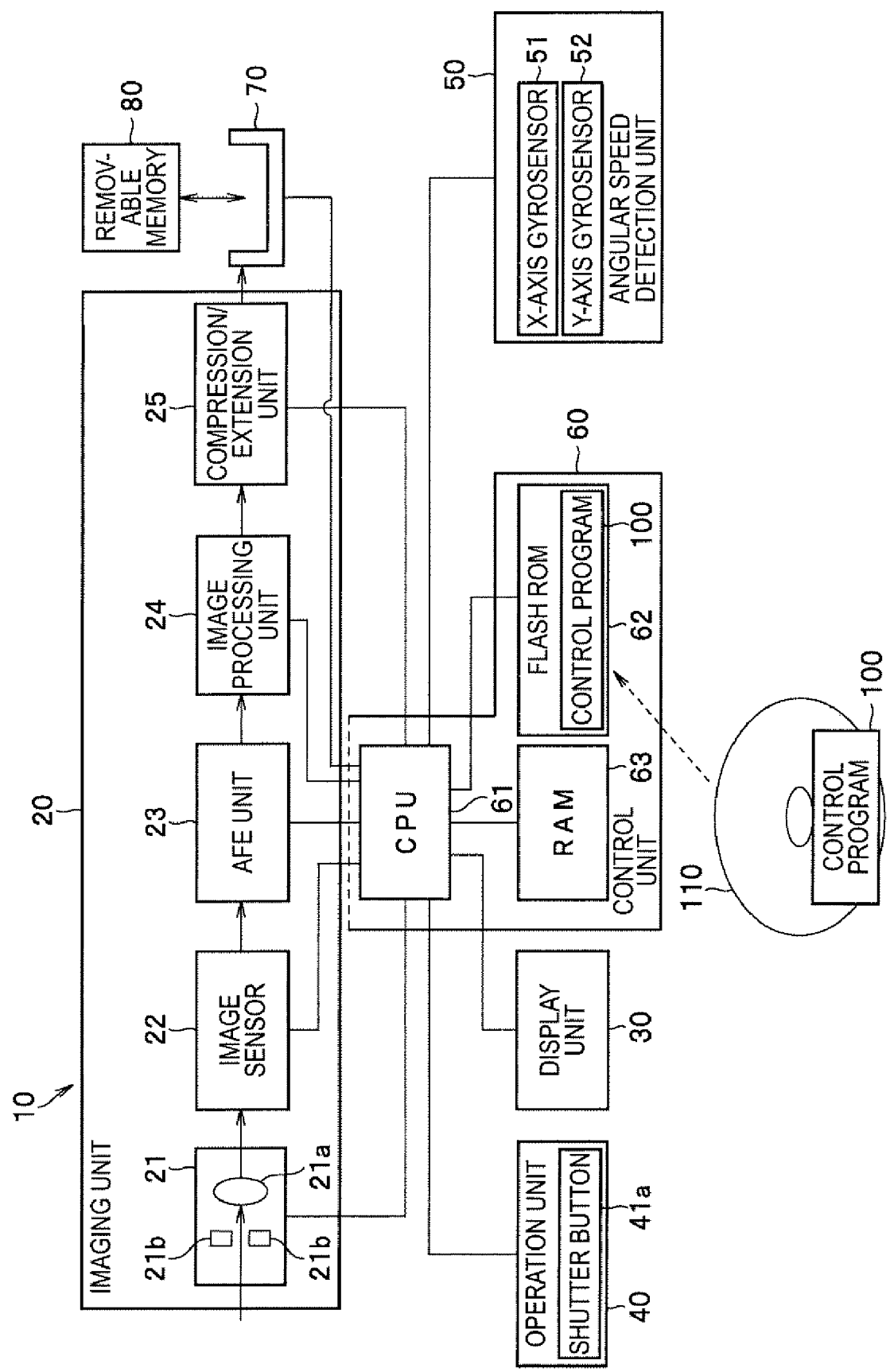
FIG. 1 is a block diagram showing the structure of a digital camera according to an embodiment of the invention.

FIG. 1 is a block diagram showing the structure of a digital camera (imaging device) 10 according to an embodiment of the invention. The digital camera 10 includes an imaging unit 20, a display unit 30, an operation unit 40, an angular speed detection unit 50, a control unit 60, an external recording and reproducing unit 70, and a removable memory 80 that is detachably mounted.

The imaging unit 20 functions as an imaging unit that photographs a still picture or a motion picture. The imaging unit 20 includes an optical system 21, an image sensor 22, an analog front end (AFE) unit 23, an image processing unit 24, and a compression/extension unit 25. The optical system 21 includes a plurality of lenses 21a and apertures 21b. The optical system 21 functions to focus a subject on a light-receiving surface of the image sensor 22 under the control of the control unit 60 when the lens 21a or the aperture 21b is driven.

The image sensor 22 is an imaging device that includes a charge-transfer device, such as an electro-optical conversion element and a CCD (charge coupled device) discretely arranged in a two-dimensional space. A COD image sensor or a CMOS image sensor may be applied as the image sensor 22. The image sensor 22 stores a charge to be obtained through the electro-optical conversion on the subject focused on the light-receiving surface for each electro-optical conversion element during a predetermined time under the control of the control unit 60 and outputs an electric signal according to the amount of light received for each electro-optical conversion element. Further, the exposure of the image sensor 22 is determined on the basis of an F value of the aperture 21b and an open time of a mechanical shutter (not shown) that is provided between the optical system 21 and the image sensor 22. Further, the exposure upon photographing is determined on the basis of a shutter speed (exposure time) set by the control unit 60. Further, the exposure time of the image sensor 22 may be adjusted by electrically controlling a charge storage time of the image sensor 22.

The AFE unit 23 quantizes the electric signal output from the image sensor 22 into a digital signal by an AD converter and outputs the digital signal as RAW data. The image processing unit 24 performs various filter processing (image processing) with respect to the RAW data to create image data for record (hereinafter, referred to as 'recording image data') and image data for preview (hereinafter, referred to as 'preview image data'). In particular, the image processing unit 24 creates the recording image data and the preview image data by performing an image forming processing of forming a color image having a density level of three primary colors (RGB), white balance correction, and gamma correction with respect to the RAW data. In respect to the preview image data, a resolution conversion processing of converting the preview image data into resolution according to resolution of the display unit 30 may be further performed.

The compression/extension unit 25 compresses the recording image data output from the image processing unit 24 and extends the compressed recording image data. The compressed image data is output to the external recording and reproducing unit 70 and the external recording and reproducing unit 70 records the image data to the removal memory 80 under the control of the control unit 60. Further, the external recording and reproducing unit 70 reads out the compressed image data recorded in the removal memory 80 and outputs the read compressed image data to the compression/extension unit 25 under the control of the control unit 60. The removal memory 80 may be a semiconductor memory, an optical disk, a magnetic disc, or a hard disc.

The display unit 30 includes a liquid crystal display and a liquid crystal driving unit, and functions as an information unit that informs various kinds of information, such as operation menus, preview images, and various warnings, under the control of the control unit 60. The digital camera 10 includes, as an operation mode, an imaging mode for capturing a still picture and a play mode for playing the photographed still pictures. In case of the imaging mode, the display unit 30 displays a motion picture (preview image) to be photographed by the imaging unit 20 or the photographed image. In case of the play mode, the display unit 30 displays images corresponding to the image data read from the removal memory 80 by the external recording and reproducing unit 70 and extended by the compression/extension unit 25. Further, the display unit 30 prepares a plurality of imaging modes.

The plurality of imaging modes may include an auto mode (automatic exposure mode) in which the control unit 60 automatically sets a shutter speed, an aperture value, or ISO (International Organization for Standardization) sensitivity for photographing, a shutter priority mode in which a user (photographer) inputs a shutter speed and the control unit 60 calculates the aperture value, an exposure priority mode in which the user inputs the aperture value and the control unit 60 calculates the shutter speed, and a program mode in which the user inputs the shutter speed and the aperture value. The ISO sensitivity primarily means sensitivity of a film to light. However, in the digital camera, the value of the ISO sensitivity is converted.

The operation unit 40 includes a plurality of operators to be operated by the user. The operators may include a shutter button 41a that is used to instruct to photograph an image and an operation key that is used to select an operation mode, set an imaging condition, and check the photographed images. The shutter button 41a is configured to detect a fully pushed state in which the shutter button 41a is pushed until the end portion and a half pushed state in which the shutter button 41a is pushed halfway.

Figure 2:
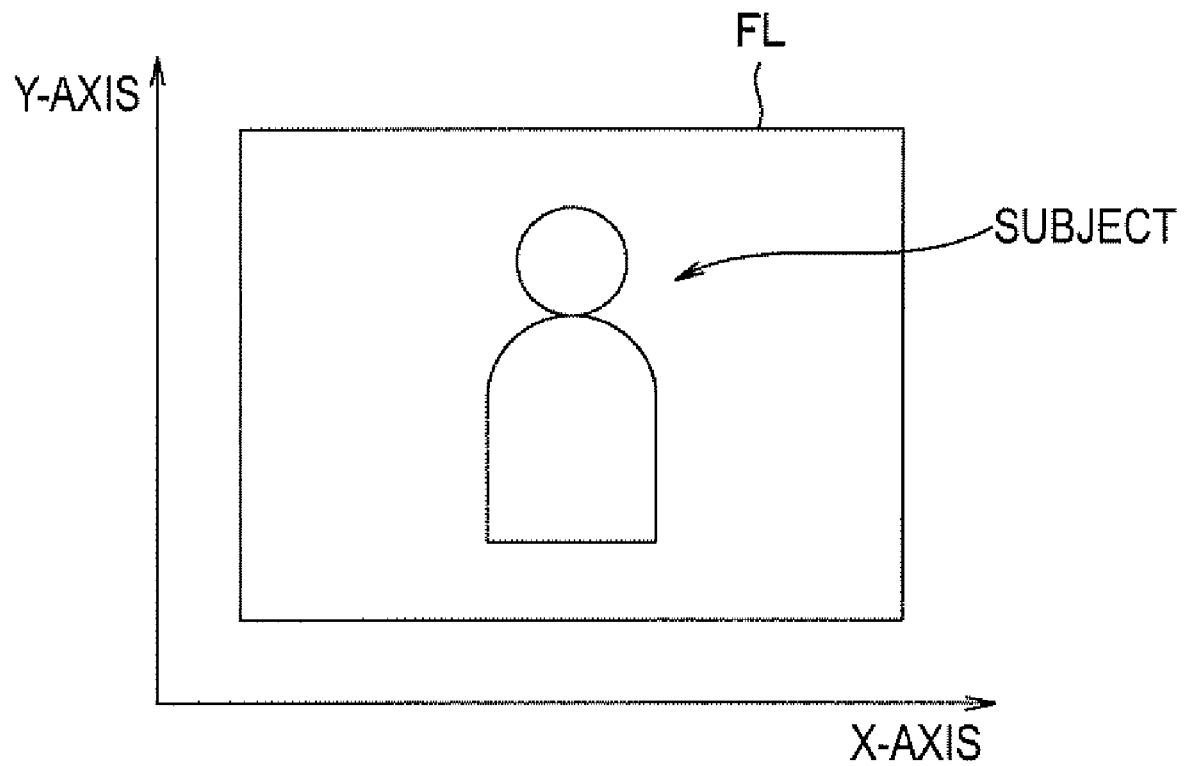
FIG. 2 is a diagram illustrating the relationship between a frame and a shake.

The angular speed detection unit 50 functions as a shake detection unit that detects a shake (camera shake) of the digital camera 10. As shown in FIG. 2, the angular speed detection unit 50 includes an X-axis gyrosensor 51 that detects an angular speed of an frame FL of the subject in a vertical direction (hereinafter, referred to as 'X axis') and a Y-axis gyrosensor 52 that detects an angular speed in a horizontal direction (hereinafter, referred to as 'Y axis'). The angular speed detection unit 50 outputs an angular speed detection signal of a voltage value according to each angular speed of the X-axis and the Y-axis to the control unit 60 using the X-axis gyrosensor 51 and the Y-axis gyrosensor 52.

The control unit 60 functions as a computer that controls the individual units of the digital camera 10. As shown in FIG. 1, the control unit 60 includes the CPU 61 that executes a plurality of programs and operations, a rewritable flash ROM (hereinafter, simply referred to as 'ROM') 62 that stores a control program 100 to be executed by the CPU 61 and a plurality of data, and a RAM 63 that functions as a work area for temporally storing the arithmetic result of the CPU 61 or the plurality of data.

The control program 100 may be distributed to be recorded in a computer-readable recording medium 110, such as a magnetic recording medium, an optical recording medium, or a semiconductor recording medium, and may be downloaded from a distribution server on a communication network. Further, the control program 100 may be stored in the ROM 62 (storage unit) by communicatably connecting the digital camera 10 to a personal computer by a cable and outputting the control program 100 of the recording medium 110 read from the personal computer to the digital camera 10.

Further, when the shutter button 41a is pushed halfway by executing the control program, the control unit 60 performs an auto focus adjustment in which the subject is focused by driving the lens 21a of the imaging unit 20 or performs an auto exposure (AE) operation. When the shutter button 41a is fully pushed, the control unit 60 adjusts the aperture 21b to obtain the photographed image by the image sensor 22 on the basis of the result of the auto exposure operation. Further, the control unit 60 displays images to be photographed (preview images) on the display unit 30. Therefore, the user may determine a composition for imaging by checking the preview image and determine a shutter chance.

In this embodiment, the control program 100 includes a shake preventing imaging program that separately detects a camera shake and a subject shake, reduces a shake, and then allows photographing. The shake preventing imaging program is executed during the imaging mode according to the setting of the user.

Figure 3:
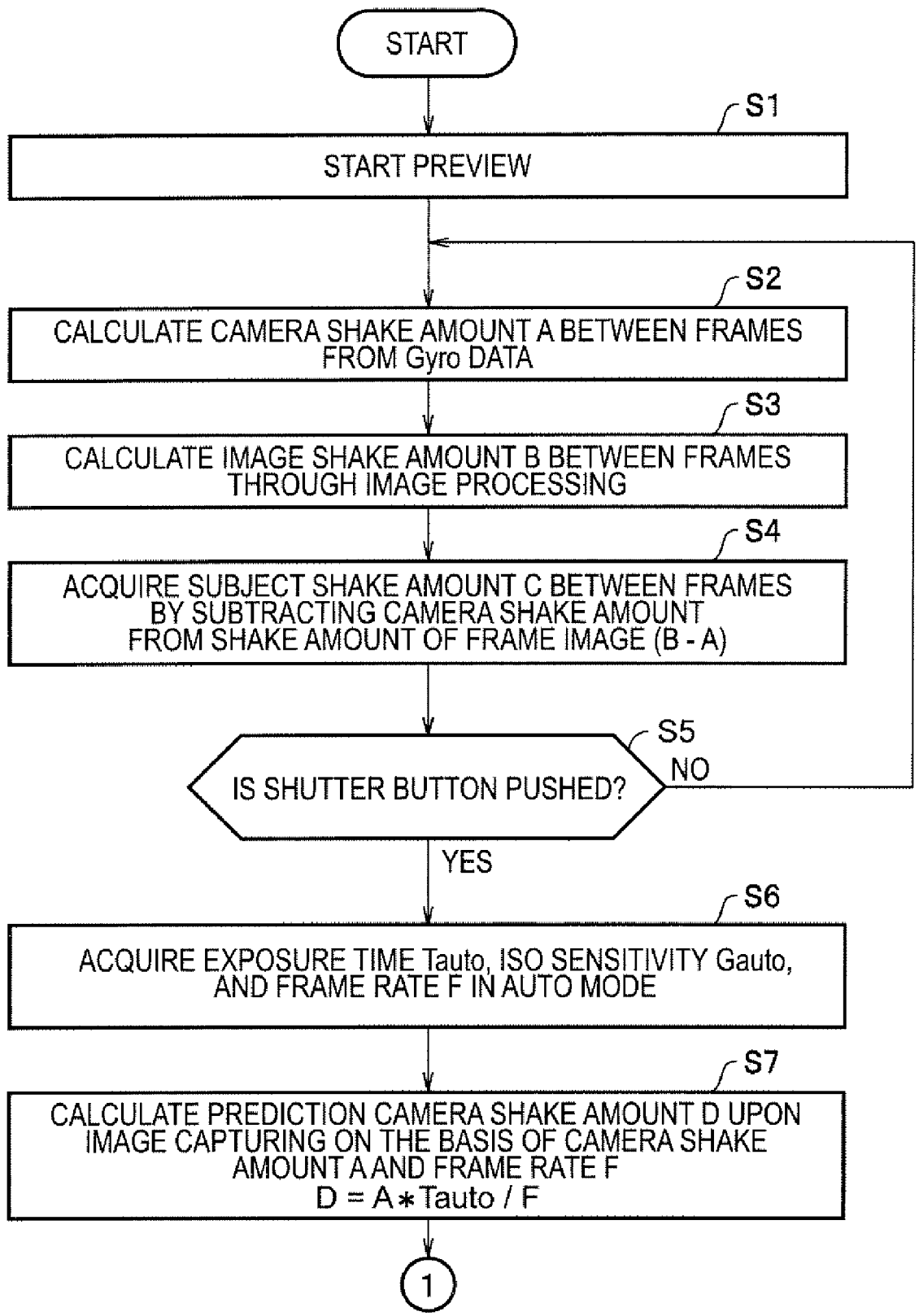
FIG. 3 is a flowchart showing the operation when an imaging program for preventing a shake is executed.
Figure 4:
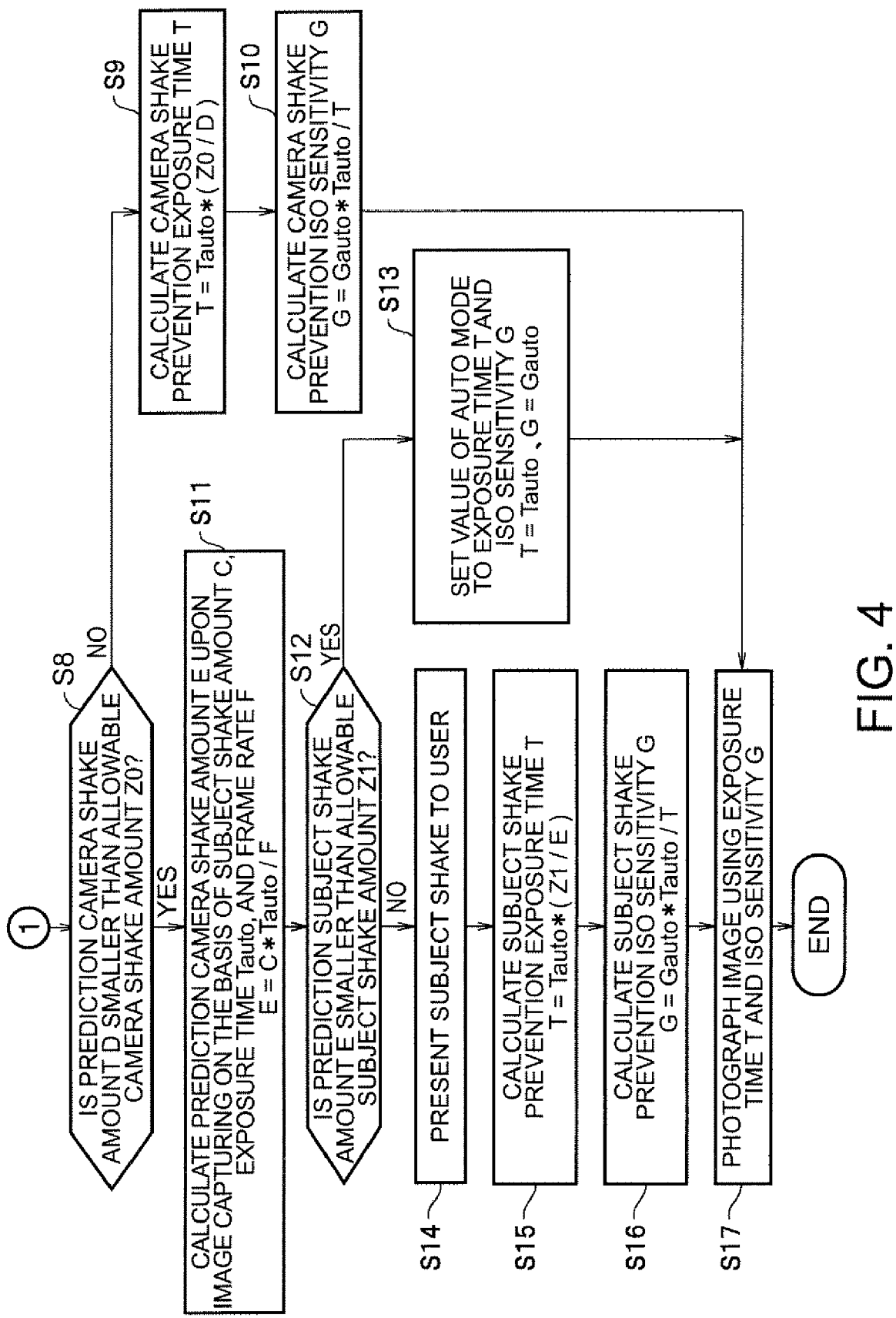
FIG. 4 is a flowchart that continues to FIG. 3.

Next, the operation when the shake preventing imaging program is executed will be described. FIGS. 3 and 4 are flowcharts illustrating the operation of the shake preventing imaging program. Hereinafter, a case where the imaging mode is set to the auto mode will be described. As shown in FIG. 3, the control unit 60 causes the imaging unit 20 start to photograph a motion picture and causes the display unit 30 display the photographed image as the preview image (Step S1). Next, the control unit 60 starts a camera shake detection processing (Step S2) and a subject shake detection processing (Steps S3 and S4).

In particular, in the camera shake detection processing, the control unit 60 starts to acquire angular speed data (gyro data) on the basis of the angular speed detection signal of the angular speed detection unit 50 and calculates a camera shake amount A between motion picture frames upon photographing on the basis of the angular speed data (Step S2). In this case, it is preferable, for example, to calculate a vector type camera shake amount A (a camera shake amount in the X direction and a camera shake amount in the Y direction).

Further, in the subject shake detection processing, the control unit 60 compares each photographed image of each frame through an image processing, calculates a motion vectors that is common to the frames, and acquires an image shake amount B (Step S3). The control unit 60 acquires a difference (subtraction value) between the acquired image shake amount B and the camera shake amount A through an arithmetic processing and acquires a difference between the image shake amount and the camera shake amount, that is, the subject shake amount C. That is, since the image shake amount B corresponds to a shake amount in which the subject shake is compounded with the camera shake, it is possible to precisely acquires the accurate subject shake by subtracting the camera shake amount A from the image shake amount B. Therefore, the control unit 60 functions as a subject shake detection unit that detects the subject shake amount C.

Further, it is preferable to calculate the vector type subject shake amount C by subtracting the vector type camera shake amount A from the vector type image shake amount B. Hereinafter, since the subject shake amount or the camera shake amount is used for the arithmetic, the size of each shake is denoted as the subject shake amount C or the camera shake amount A.

The control unit 60 determines whether the shutter button 41a is pushed (fully pushed) or not (Step S5). When the shutter button 41a is not pushed (NO in Step S5), the process proceeds to Step S2, and Steps S2 to S4 are repeated.

Meanwhile, when the shutter button 41a is pushed (YES in Step S5), in order to calculate a prediction camera shake amount D when an image is photographed on a condition automatically set by the control unit 60 in a state where the current camera shake (camera shake amount A) occurs, the control unit 60 acquires the automatically set exposure time (the exposure time of the auto mode) Tauto, the ISO sensitivity Gauto, and a frame rate F of the image (Step S6), multiplies the camera shake amount A measured immediately before by the exposure time Tauto, and divides the multiplied value by the frame rate F. Accordingly, the prediction camera shake amount D is acquired (Step S7).

Next, as shown in FIG. 4, the control unit 60 determines whether the prediction camera shake amount D is lower than a predetermined allowable camera shake amount Z0 (Step S8). In this case, if the prediction shake amount D is higher than a predetermined allowable shake amount Z0 (NO in Step S8), in order to calculate the imaging condition for preventing the camera shake, the control unit 60 calculates a camera shake prevention exposure time T (T=exposure time Tauto * (allowable camera shake amount Z0/prediction shake amount D)) (Step S9) and calculates an ISO sensitivity G (G=ISO sensitivity Gauto * exposure time Tauto/exposure time T), which is suitable for the exposure time T (Step S10). Further, the control unit 60 causes photographing to be performed by setting the exposure time T and the ISO sensitivity G to the imaging condition (Step S17). Therefore, in the automatically set imaging condition, when the shaken image is photographed, it is possible to perform photographing while preventing the shake by setting the imaging condition for preventing the camera shake.

Meanwhile, when the prediction shake amount D is lower than the predetermined allowable shake amount Z0 (YES in Step S8), in order that the control unit 60 calculates a prediction camera shake amount E when an image is photographed on the condition automatically set by the control unit 60 in a state where the current subject shake (subject shake amount C) occurs, the control unit 60 multiplies the subject shake amount C by the exposure time Tauto, and divides the multiplied value by the frame rate F. Accordingly, the prediction camera shake amount E is acquired (Step S11).

Further, the control unit 60 determines whether the prediction camera shake amount E is lower than a predetermined allowable subject shake amount Z1 (Step S12). In this case, if the prediction camera shake amount E is lower than the predetermined allowable subject shake amount Z1 (YES in Step S12), the control unit 60 allows photographing to be performed on the automatically set imaging condition (Step S13).

When the prediction camera shake amount E is higher than the predetermined allowable subject shake amount Z1 (NO in Step S12), since the subject shake exceeding an allowable range occurs, the control unit 60 first displays information (text or image) corresponding to the subject shake on the display unit 30 so as to inform the user of the subject shake (Step S14). Then, in order that the control unit 60 calculates an imaging condition to prevent the subject shake, the control unit 60 calculates a subject shake prevention exposure time T (T=exposure time Tauto * (allowable subject shake amount Z1/prediction camera shake amount E)) (Step S15) and calculates an ISO sensitivity G (G=ISO sensitivity Gauto * exposure time Tauto/exposure time T), which is suitable for the exposure time T (Step S16). Further, the control unit 60 allows photographing to be performed by setting the exposure time T and the ISO sensitivity G to the imaging condition (Step S17). Therefore, in the automatically set imaging condition for the subject shake, when the shaken subject is photographed, it is possible to perform photographing while preventing the subject shake by setting the imaging condition for preventing subject shake.

Further, after the shutter button 41a is pushed, Steps S6 to S17 are performed in extremely short time. That is, the imaging processing is performed immediately after the user pushes the shutter button 41a. Therefore, it is possible to acquire an image at the user's desired shutter chance. Further, during the imaging mode, Steps S1 to S17 are repeatedly performed whenever an image is captured. That is, whenever the user pushed the shutter button 41a, an image is photographed while the camera shake or the subject shake is prevented, As described above, according to the above-described embodiment, the camera shake amount A is acquired on the basis of the angular speed, the image shake amount B is acquired on the basis of the photographed image, and the subject shake amount C is acquired on the basis of the difference between the camera shake amount A and the image shake amount B. Therefore, it is possible to accurately detect the subject shake. At this time, when the subject shake amount C exceeds the allowable value, the fact that the subject shake amount C exceeds the allowable value is informed. Therefore, the user can easily recognize the subject shake. Further, when the prediction shake amount E based on the subject shake amount C exceeds the predetermined allowable shake amount Z1, the image is photographed under the imaging condition for preventing the subject shake. Therefore, even though the subject moves, for example, when a person corresponding to the subject is running, it is possible to easily photograph an image with no shake.

According to the above-described embodiment, since the image shake amount B is detected on the basis of the motion vector of the image to be photographed, it is possible to accurately detect the image shake amount B. Furthermore, it is possible to accurately detect the subject shake. Further, in the above-described embodiment, the motion vector may be detected with accuracy enough to determine the size of the image shake B. At this time, the detection accuracy may be low. If the detection accuracy of the motion vector is low, the load of the control unit 60 may be reduced.

In the above-described embodiment, if the prediction shake amount D based on the camera shake amount A is higher than the allowable shake amount Z0, the image is photographed under the imaging condition for preventing the camera shake. When the prediction shake amount D is lower than the allowable shake amount Z0, the image is photographed under the imaging condition for preventing the subject shake. Therefore, it is possible to automatically setting an appropriate imaging condition according to the camera shake or the subject shake. Further, it is possible to appropriately photograph an image according to the kind of shake.

APPLICATIONS

In the above-described embodiment, a case where an imaging program for preventing the shake is used in the auto mode has been described, but the invention is not limited thereto. That is, the imaging program for preventing the shake may be executed in other modes. In this case, when a large subject shake or camera shake occurs under an imaging condition manually set by the user, it is possible to change the imaging condition to an imaging condition that can prevent such a shake. Therefore, it is possible to easily and accurately photograph an image while preventing the subject shake or the camera shake.

Further, in the above-described embodiment, the camera shake detection processing of Step S2 and the subject shake detection processing of Steps S3 and S4 may start after it is detected that the shutter button 41a is pushed halfway. According to this structure, before the shutter button 41a is pushed halfway, the above-described processing is not performed. Therefore, it is possible to reduce electric power consumption.

Further, in the above-described embodiment, a case where the camera shake is detected by the gyrosensor, but the invention is limited thereto. For example, another shake detecting means such as an acceleration sensor can be applied.

Further, in the above-described embodiment, a case where the subject shake is informed by the display has been described, but the invention is not limited thereto. For example, the subject shake may be informed by sound.

Further, in the above-described embodiment, a case where the invention is applied to the digital camera 10 has been described, but the invention is not limited thereto. For example, the invention may be applied to an apparatus where the shake causes a problem. For example, the invention may be applied to an imaging apparatus having a still picture photographing function or a motion picture photographing function, other than the digital camera. In particular, the invention may be applied to a camera-equipped cellular phone, a silver salt camera, a camera-equipped or external camera-equipped PDA, or a notebook computer. Further, the above-described apparatus includes a structure for detecting a subject shake, but the invention is not limited thereto. That is, a subject shake detection unit may be additionally prepared and the subject shake may be detected by the subject shake detection unit.

The entire disclosure of Japanese Patent Application No. 2006-101352, filed Apr. 3, 2006 is expressly incorporated by reference herein.

What is claimed is:

1. An imaging device comprising:
an imaging unit that photographs a subject;
a shake detection unit that detects a shake amount of the imaging unit;
a subject shake detection unit that detects an image shake amount from a motion picture to be photographed by the imaging unit and acquires a subject shake amount on the basis of a difference between the image shake amount and the shake amount; and
an imaging control unit that allows photographing to be performed under an imaging condition for preventing a subject shake, wherein the imaging control unit calculates a prediction shake amount on the basis of the subject shake amount and an automatically set imaging condition, sets an imaging condition for preventing a subject shake on the basis of the prediction shake amount when the prediction shake amount exceeds an allowable value, and allows photographing to be performed under the set imaging condition.

2. The imaging device according to claim 1,
wherein the subject shake detection unit acquires a motion vector of the motion picture to be photographed and detects the image shake amount on the basis of the motion vector.

3. The imaging device according to claim 1, further comprising an informing unit wherein, when the prediction shake amount exceeds the allowable value, the informing unit informs a user of the subject shake.

4. The imaging device according to claim 1,
wherein the imaging control unit calculates the prediction shake amount based on the shake amount acquired by the shake detection unit and the automatically set imaging condition, sets an imaging condition for preventing a camera shake on the basis of the shake amount when the prediction shake amount exceeds the allowable value and allows photographing to be performed under the set imaging condition for preventing the camera shake, and sets an imaging condition for preventing the subject shake when the prediction shake amount is below the allowable value and allows photographing to be performed under the set imaging condition for preventing the subject shake.

5. A method of controlling an imaging device, the method comprising:
detecting a shake amount of an imaging unit photographing a subject;
detecting an image shake amount from a motion picture to be photographed by the imaging unit and acquiring a subject shake amount on the basis of a difference between the image shake amount and the shake amount; and
calculating a prediction shake amount on the basis of the subject shake amount and an automatically set imaging condition;
setting an imaging condition for preventing a subject shake on the basis of the prediction shake amount when the prediction shake amount exceeds an allowable value; and
allowing photographing to be performed under the set imaging condition for preventing the subject shake.

6. A computer-readable recording medium having recorded thereon a control program that allows a computer to function as:
a shake detection unit that detects a shake amount of an imaging unit;
a subject shake detection unit that detects an image shake amount from a motion picture to be photographed by the imaging unit and acquires a subject shake amount on the basis of a difference between the image shake amount and the shake amount; and
an imaging control unit that allows photographing to be performed under an imaging condition for preventing a subject shake, wherein the imaging control unit calculates a prediction shake amount on the basis of the subject shake amount and an automatically set imaging condition, sets an imaging condition for preventing a subject shake on the basis of the prediction shake amount when the prediction shake amount exceeds an allowable value, and allows photographing to be performed under the set imaging condition.

* * * * *